Aug. 2, 1938.  P. FELDHOFF  2,125,552
THREADLESS TUBE CONNECTION
Filed July 7, 1936
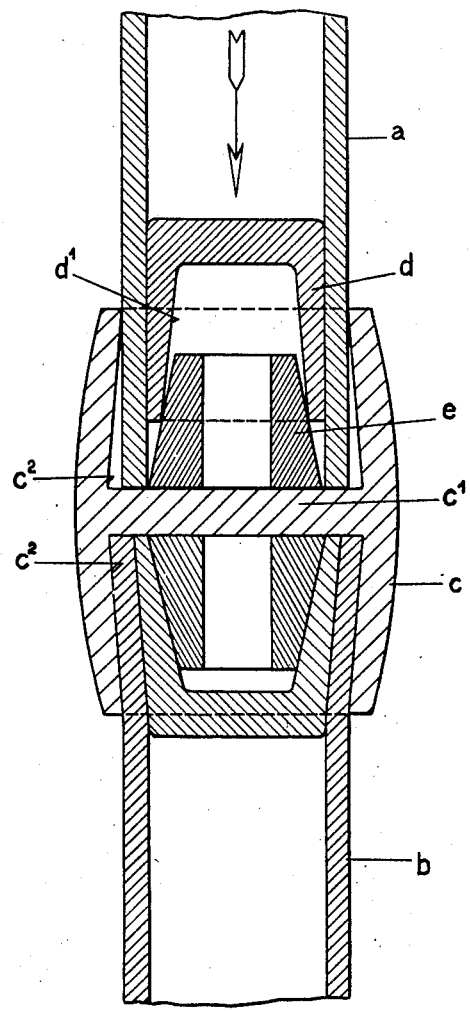
Inventor:
Paul Feldhoff
By Chatwin Company
Attys Patented Aug. 2, 1938

2,125,552

UNITED STATES PATENT OFFICE 2,125,552

THREADLESS TUBE CONNECTION

Paul Feldhoff, Radevormwald/Rhineland, Germany, assignor to "Kronprinz" Aktiengesellschaft für Metallindustrie, Solingen-Ohligs/-Rhineland, Germany, a corporation of Germany Application July 7, 1936, Serial No. 89,353
In Germany December 12, 1935

1 Claim. (Cl. 287—113)

The object of the invention consists of a threadless tube connection which is particularly suited for the construction of bicycles, but also for other purposes, which may be contemplated.

Threadless tube connections are known in which a widening or spreading cone with smaller diameter is placed in a sleeve with a conical interior hole and the tube is forced under high pressure into the conically diminished annular space there-between. This arrangement has the disadvantage that a special pressure device is required for the manufacture of this tube connection and that the tube itself is subjected during the pressing process to a strong bending moment so that it easily may lose its shape when excess pressure is present, moreover since very high pressure must be applied by reason of the conically diminished annular space into which is forced the end of the tube.

The threadless tube connection according to the present invention though differing from the known constructions consists likewise of a connecting sleeve provided with a conically bored interior, which co-acts with a spreading cone and which girds or holds the end of the tube inserted there-between and the cone in that a cylindrical member provided with a conical hole sits on the spreading or widening cone and touches the inner wall of the tube, which member by means of its widening or spreading caused by axial pressure widens the tube inserted in the connecting sleeve and forces it against the wall thereof. In order to increase further the strength of this tube connection the contact surfaces of the individual members may be roughened or provided with grooves or the like.

The tube connection constructed in this manner guarantees an especially strong connection in spite of its simple manufacture; and in consequence of the fact that all bending moments are avoided it is chiefly suitable for thin-walled and long tubes such as those used in bicycle constructions.

The accompanying drawing illustrates by way of example in longitudinal section a tube connection; position and shape of the single parts of the tube connection are shown in the upper part of the drawing before, and in the lower half after, the pressing operation.

The sleeve $c$ provided with a partition $c^1$ and the holes $c^2$ which are conically widened towards the centre, serve for the connection of the two tubes $a$ and $b$. Each side of the tube connection is further provided with a cylindrical spreading or widening member $d$ having a conical hole $d^1$ and a hollow or solid spreading or widening cone $e$. The outer diameter of the spreading or widening member $d$ corresponds to the normal width of the tube whilst its conical hole $d^1$ is of slightly more slender construction than the spreading or widening cone $e$ the base of which generally corresponds to the cross-section of the normal tube.

In order to effect the tube connection the separate parts are arranged in the manner shown in the upper half of the drawing, that is to say the spreading or widening cone $e$ is first of all placed on the partition $c^1$, then the spreading or widening member $d$ placed on the cone $e$ and finally the tube $a$ is inserted until it hits against the partition $c^1$. Then a mandrel introduced into the tube $a$ is placed on to the spreading or widening member $d$ and driven forward in the direction of the arrow shown in the drawing by hammer blows or by means of a suitable pressing device. In this way is extended or widened the member $d$ sliding over the cone $e$ so that the latter on its part drives sideways the end of the tube inserted in the sleeve, which is gradually forced against the interior wall of the sleeve and adapts itself to the shape thereof. When at the end of the pressing action the member $e$, the inner end of which may also be provided with slots, hits against the partition $c^1$, the separate parts of the tube connection have adopted the shape shown in the lower half of the drawing, that is to say the tube has come into close touch with the sleeve $c$. The connection between tube and sleeve effected in this manner can be strengthened further still by roughening the interior walls of the sleeve or by roughening or providing with longitudinal grooves the surfaces of the tube so that the pressure effected by the expansion, at the same time has a gripping effect. Corresponding safety measures may be provided at all other contact surfaces. The spreading or widening cone $e$ may also be made in one piece with the partition $c^1$; however, a separate arrangement is more suitable, since in this case a very accurate centering is automatically effected during the manufacture of the tube connection.

The tube connection, which is not only suitable for circular, but also, for instance, for oval and other profiles, can also be applied correspondingly to angular, T- or cross-pieces. Finally, it is possible to seal or close the ends of tubes produced in accordance with the invention.

I claim:—

A threadless tube connection for long and thin walled tubes comprising an outer sleeve having a conical interior receiving the ends of the tubes, a transverse partition in said sleeve, conical members disposed against each side of said partition interiorly of the tube ends and hollow cylindrical members inserted between the cones and the tubes, said cylindrical members being interiorly conical, to force the tube ends against the outer sleeve.

PAUL FELDHOFF.